Figure 1:
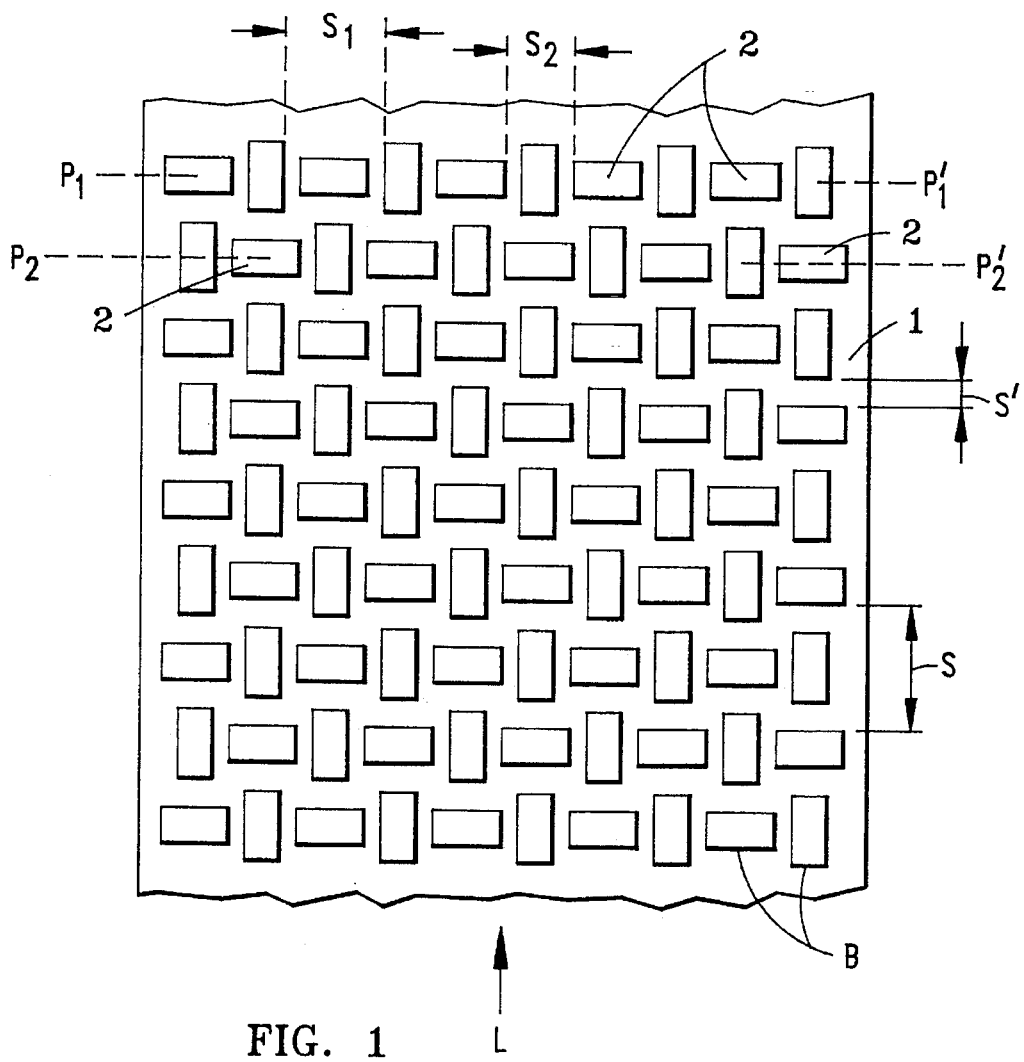

United States Patent [19]
Wyckoff

[11] Patent Number: 5,557,461
[45] Date of Patent: Sep. 17, 1996

[54] OMNIDIRECTIONAL RETRO-REFLECTIVE ROADWAY MARKER AND THE LIKE

[75] Inventor: Charles W. Wyckoff, Needham, Mass.

[73] Assignee: BriteLine Industries, Inc., Denver, Colo.

[21] Appl. No.: 451,234

[22] Filed: May 26, 1995

[51] Int. Cl.⁶ .............................. G02B 5/12; G02B 5/128
[52] U.S. Cl. ..................... 359/551; 359/534; 359/536; 359/547; 404/14
[58] Field of Search ..................... 359/529–532, 359/534–542, 546–547, 551, 552; 404/9, 12, 14, 16; 116/63 R

[56] References Cited

U.S. PATENT DOCUMENTS

| | | | |
|---|---|---|---|
| 3,399,607 | 9/1968 | Eigenmann | 359/551 |
| 3,768,383 | 10/1973 | Tucker | 359/551 |
| 4,040,760 | 8/1977 | Wyckoff | 404/14 |
| 4,681,401 | 7/1987 | Wyckoff | 359/547 |
| 4,969,713 | 11/1990 | Wyckoff | 359/547 |

*Primary Examiner*—James Phan
*Attorney, Agent, or Firm*—Rines and Rines

[57] ABSTRACT

A novel roadway or similar marker strip having preferably retro-reflective-beaded protuberances in a critical "herringbone"-like pattern that provides a surprising degree of azimuthal uniform omindirectionality of light reflected from the strip.

13 Claims, 2 Drawing Sheets

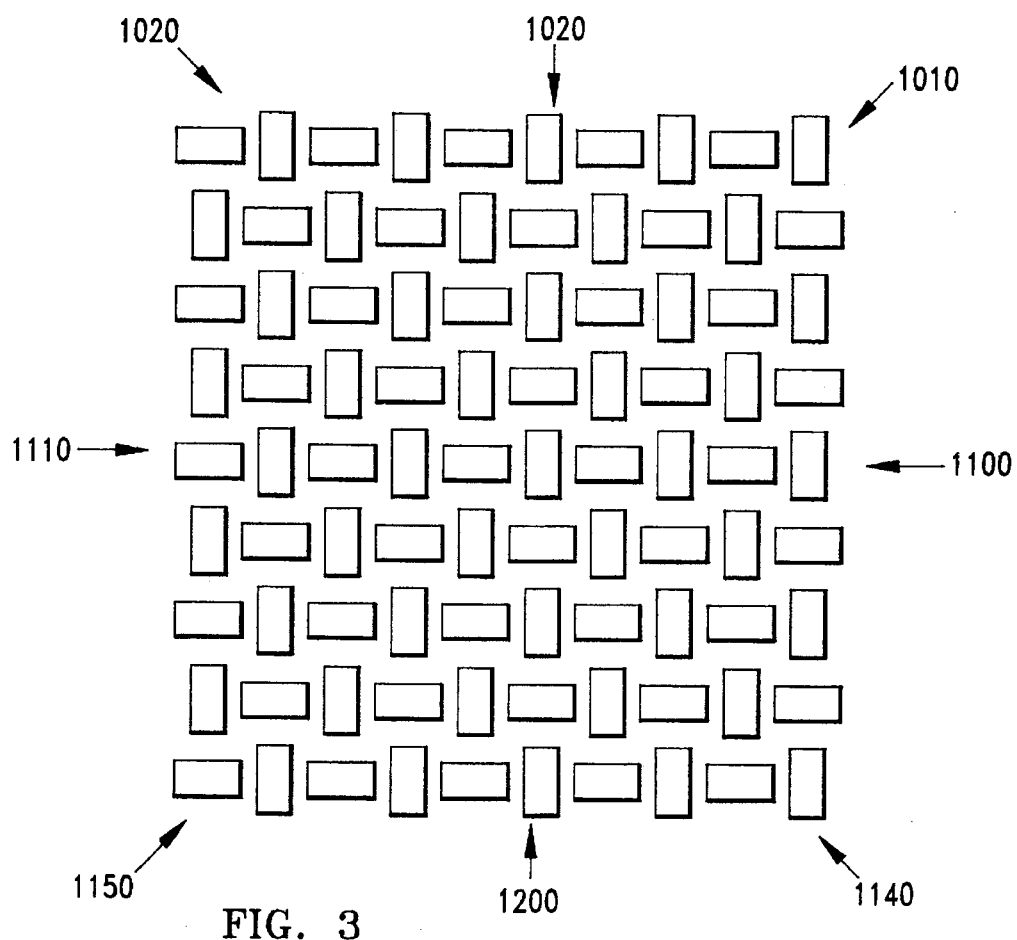
FIG. 3
FIG. 4
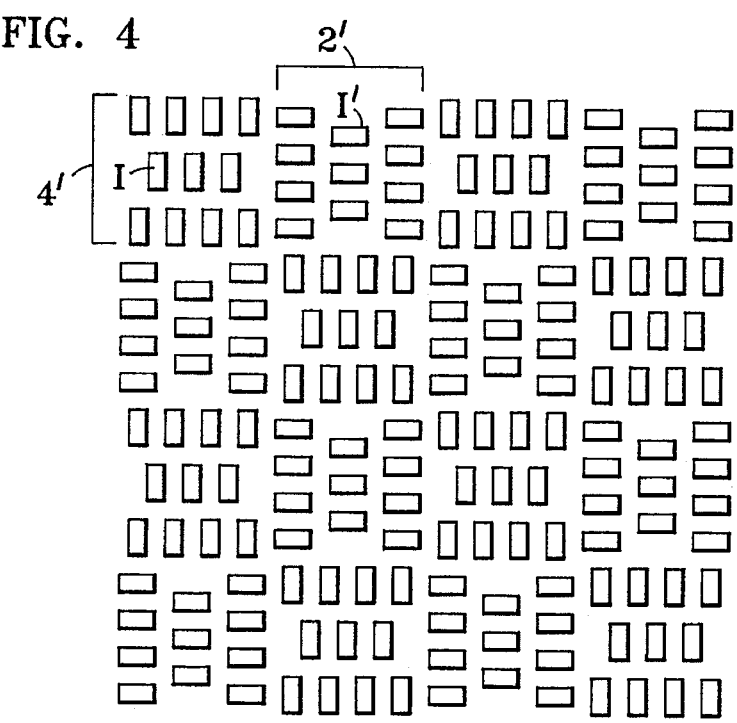

OMNIDIRECTIONAL RETRO-REFLECTIVE ROADWAY MARKER AND THE LIKE

The present invention relates to the provision of distinctive marking in the directions of travel on motoring highways, airports and other surfaces with the aid of thin marker strips adhered to the traveling or other surfaces and employing successively spaced rows of protruding wedges or blocks provided preferably with retroreflective materials, but at other times with only diffusely reflecting surfaces; the invention being more particularly concerned with improved marker strips for such and related purposes.

BACKGROUND OF THE INVENTION

My earlier U.S. Pat. No. 4,681,401 issued on Jul. 21, 1987, and U.S. Pat. No. 4,969,713 issued Nov. 13, 1990, disclosed effective improved thin surface marking strips for adhering to a road surface or the like embodying somewhat flattened wedges or blocks having retro-reflective material and of preferably substantially trapezoidal shape in longitudinal vertical section (longitudinally of the strip) with rather critical separations between the wedges relative to height-width of the wedges to obviate shadowing effects, as in sunlight, to provide improved daylight observation, and to increase effectiveness and life, particularly under conditions of rain-covered surfaces and snow. Earlier art dealing with this type of technology is disclosed in U.S. Pat. Nos. 4,388,359; 4,236,788; 4,069,787; 4,040,760 and 3,920,345.

There are occasions where the light from a vehicle or other source incident at relatively low angles to the traveling or other surface carrying the reflective strips does not come from the preferred, intended or usual directions longitudinally along the marker strip, but, rather, from different azimuthal directions about the strip. Some of the prior configurations of the retro-reflective strips of the above-referenced patents will provide some useful reflective response from a number of side directions, but there is great variation in response to the various different directions.

The present invention, in addressing this problem, now enables substantially equally or omnidirectionally efficient reflective response, and with improved efficacy.

OBJECTS OF INVENTION

A principal object of the invention, accordingly, is to provide a new and improved marker strip construction and configuration that improves upon the retro-reflection efficiency not only for incident light directed along the strip, but substantially uniformly for light incident from all other directions about the strip.

A further object is to provide such a new and improved marker strip that may, in some instances, be used for diffuse reflection from the strip without retro-reflective beads.

Other and additional objects will be addressed hereinafter and are more particularly delineated in the appended claims.

SUMMARY OF INVENTION

In summary, the preferred marker construction of the invention that has been found to achieve these novel results involves a retro-reflective roadway marker strip and the like having, in combination, a first plurality of transversely extending parallel rows of transversely uniformly spaced transversely oriented blocks protruding upwardly of the strip, and with successive of the parallel rows uniformly longitudinally spaced and transversely staggered with respect to one another; a second plurality of transversely extending parallel rows of transversely uniformly spaced longitudinally oriented blocks similarly protruding upwardly of the strip, and with successive of the parallel rows thereof uniformly longitudinally spaced and transversely staggered with respect to one another; the first and second pluralities of rows being uniformly transversely and longitudinally interleaved; with the longitudinally oriented blocks symmetrically positioned in the transverse spaces between adjacent transversely oriented blocks of each row; and the transversely oriented blocks symmetrically positioned in the longitudinal spaces between adjacent transversely oriented blocks; and similar edge faces of the blocks of each of the pluralities of rows being provided with retro-reflective beads. With all of the edge faces of the blocks provided with retroreflective beads, substantially uniform omnidirectional retroreflection is achieved with low angle incident light from all azimuthal directions about the strip, including the principal directions longitudinally along the strip.

Preferred and best mode designs will now be described.

DRAWINGS

Figure 2:
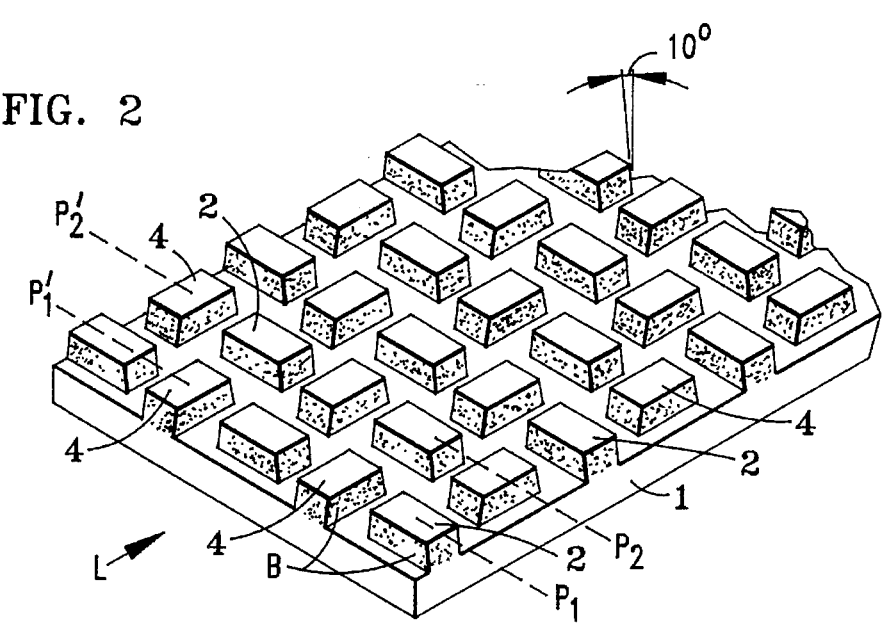

The invention will now be described with reference to the accompanying drawings, FIG. 1 of which is a plan view showing the pattern of protuberances laid out in a "herringbone" configuration in accordance with the present invention;

FIG. 2 is an isometric view of the herringbone pattern of FIG. 1 showing the edge faces covered with retroreflecting glass beads or microspheres;

FIG. 3 is a plan view similar to FIG. 1 but with arrows designating viewing directions at angles of 0°, 45°, 90°, 135°, 180°, 225°, 270° and 315°. The numbers at the ends of the arrows correspond to relative light level reflectance readings at the various angles, demonstrating remarkable omni-directionality; and FIG. 4 is a plan view of a parquet herringbone-like modified pattern of interrupted ridges.

DESCRIPTION OF INVENTION

Referring to FIGS. 1 and 2, the preferred marker construction of the invention that has been found to achieve these novel results involves a retro-reflective roadway thin marker strip 1, and the like, as of the plastic and rubber-based materials discussed in the above-cited patents, having a first plurality of transversely extending parallel rows $P_{1-}$, $P_{2-}$, etc. of transversely uniformly spaced transversely oriented blocks 2 protruding upwardly of the strip. Successive of the parallel rows, such as $P_1$, and $P_2$, are uniformly longitudinally spaced and transversely staggered with respect to one another. A second plurality of transversely extending parallel rows $P_1^1$, $P_2^1$, etc. of transversely uniformly spaced longitudinally oriented blocks 4 is provided (substantially 90° to the transverse block orientation) with the blocks similarly protruding upwardly of the strip, and with successive of the parallel rows, $P_1^1$, $P_2^1$, thereof uniformly longitudinally spaced and transversely staggered with respect to one another. The first and second pluralities of rows, $P_1$, $P_2$ etc. and, $P_1^1$, $P_2^1$, etc. are uniformly transversely and longitudinally interleaved, as shown, with the longitudinally oriented blocks 4 symmetrically positioned in the transverse spaces between adjacent transversely oriented blocks 2 of each row; and the transversely oriented blocks 2 symmetrically positioned in the longitudinal spaces between adjacent longitudinally oriented blocks.

Similar edge faces of the blocks of each of the pluralities of rows are preferably provided with retro-reflective beads or microspheres B as of the glass types described in said patents. With all of the edge faces of the blocks provided with retroreflective beads, substantially uniform omnidirectional retroreflection can now be achieved with low angle incident light from all azimuthal directions about the strip, including the principal directions longitudinally along the strip, as later described in connection with FIG. 3.

Referring again to FIGS. 1 and 2, light from a motor vehicle headlamp impinges the pattern along the longitudinal direction L and is retroreflected back to the motorist by means of the glass microsphere beads or lenses B which cover all the edge faces of the protuberances in a plane normal to the paper. All of the edge faces at right angles to the longitudinal direction L retroreflect the light from the motor vehicle headlamps. Some of the edge faces have a greater spacing S, between them than others, such as S', and can thus be observed from a greater distance.

The isometric view of this "herringbone" pattern shown in FIG. 2 illustrates the disposition of the light-reflecting glass microspheres on the edge faces. It will be noted that there are preferably substantially no glass microspheres on the top surfaces of the block protuberances nor even on the valley floor at the base of the protuberances. This is important because these horizontal surfaces are light-scattering surfaces and supply the marker with its ambient daylight visibility, which would otherwise not be present if these surfaces were covered with glass microspheres. Because of possible shadowing effects and dirt accumulation, the valley floor contributes only a small portion of the marker's daylight appearance.

Presented in FIG. 3 are relative light reflectance values as measured at night from headlamp illumination from different directions. These figures of retroreflection in the various arrowed directions show the remarkable uniformity of the omnidirectionality of the marker of the invention, as observed by a motorist at night. A sample of the configuration shown in FIG. 1 was used to make these retroreflective measurements from different orientations, using an Ecolux meter. This device, when positioned on top of the material whose retroreflection is to be measured, emits a collimated beam of light which impinges the sample material at an angle of 2° above the horizontal. A photoelectric cell in the optical system then measures the amount of light being reflected from the sample and displays this value on the meter in units of meter candelas per square meter for the operator to record. The Ecolux meter was then oriented at 45° over the same area on the material and another reading was made and recorded. This process was repeated at an orientation of 90° and then at 135°, 180°, 225°, 270° and 315° until a complete circle of measurements was made. This process was repeated several times and the average relative readings for each position were then recorded as plotted in FIG. 3. The excellent omni-directionality of retroreflection has been found to be reasonably consistent, with slight variability resulting from variations in application of the retroreflective microspheres during manufacture.

As shown, the blocks are preferably, though not always essentially, of similarly dimensioned substantially rectangular configuration. The top surfaces of each block are shown substantially flat, and the edge faces of each block preferably somewhat inclined (about 10° as shown in FIG. 2) such that the blocks are of substantially trapezoidal shape in longitudinal vertical section. The area of the top surface of each block is substantially greater than the area of each of the inclined edge faces, and the transverse spaces $S_1$ (FIG. 1) between adjacent transversely oriented blocks 2 in each row are somewhat smaller than the transverse space $S_2$ between adjacent longitudinally oriented blocks 4 in that row.

As before indicated, preferably all the edge faces of the blocks are provided with retroreflective beads B, providing substantially uniform omni-directional reflectance to light incident upon the strip at low angles of incidence to the roadway and from all directions about the strip, as indicated in FIG. 3.

While the marker strip of FIGS. 1 through 3 is oriented with the longitudinally oriented blocks 4 disposed parallel to the direction L of the roadway, the strip may be otherwise oriented, as with the longitudinally oriented blocks disposed at about 45° to the direction L of the roadway.

Another marker construction of the invention, FIG. 4, also achieves these novel results and is based upon the construction disclosed in my previously mentioned U.S. Pat. No. 4,969,713, having successive spaced segmented block rows staggered or interrupted transversely from the blocks of the adjacent rows. While this configuration produces an approach to omni-directionality of retroreflection to incident light, it has now been discovered that if this pattern of interrupted rows is formed by alternating longitudinal block arrays $4^1$ and transverse block arrays $2^1$, each array made up of a plurality (three) of sub-rows, as in the longitudinal-transverse orientations of blocks 4 and 2 in the embodiments of FIGS. 1 and 2, so as to form a parquet "herringbone"-like pattern, substantially complete omni-directionality in retroreflection of light was also achieved. The intermediate sub-rows I, I' are shown staggered between the outer sub-rows.

Further modifications will occur to those skilled in this art, and such are considered to fall within the spirit and scope of the invention as defined in the appended claims.

What is claimed is:

1. A retro-reflective roadway marker strip having, in combination, a first plurality of transversely extending parallel rows of transversely uniformly spaced transversely oriented blocks protruding upwardly of the strip, and with successive of the parallel rows uniformly longitudinally spaced and transversely staggered with respect to one another; a second plurality of transversely extending parallel rows of transversely uniformly spaced longitudinally oriented blocks similarly protruding upwardly of the strip, and with successive of the parallel rows thereof uniformly longitudinally spaced and transversely staggered with respect to one another; the first and second pluralities of rows being uniformly transversely and longitudinally interleaved, with the longitudinally oriented blocks symmetrically positioned in the transverse spaces between adjacent transversely oriented blocks of each row, and the transversely oriented blocks symmetrically positioned in the longitudinal spaces between adjacent longitudinally oriented blocks, and similar edge faces of the blocks of each of the pluralities of rows being provided with retro-reflective beads.

2. A marker strip as claimed in claim 1 and in which all the blocks are of similarly dimensioned substantially rectangular configuration.

3. A marker strip as claimed in claim 2 and in which the top surfaces of each block are substantially flat and the edge faces of each block inclined such that the blocks are of substantially trapezoidal shape in longitudinal vertical section.

4. A marker strip as claimed in claim 3 and in which the area of the top surface of each block is substantially greater than the area of each of the inclined edge faces.

5. A marker strip as claimed in claim 3 and in which all the edge faces of the blocks are provided with said retro-reflective beads, providing substantially uniform omni-directional retro-reflection to light incident upon the strip at low angles of incidence to the roadway and from all directions about the strip.

6. A marker strip as claimed in claim 3 and in which the angle of incline of the edge face is about 10°.

7. A marker strip as claimed in claim 1 and in which the transverse spaces between adjacent transversely oriented blocks in each row are somewhat smaller than the transverse space between adjacent longitudinally oriented blocks in that row.

8. A marker strip as claimed in claim 1 and in which the strip is oriented with the longitudinally oriented blocks disposed parallel to the direction of the roadway.

9. A marker strip as claimed in claim 1 and in which the strip is oriented with the longitudinally oriented blocks disposed at about 45° to the direction of the roadway.

10. A marker strip as claimed in claim 1 and in which each of the longitudinally and transversely oriented blocks is replaced by an array of corresponding longitudinally and transversely oriented blocks.

11. A marker strip as claimed in claim 10 and in which each array comprises three parallel rows of blocks, with the intermediate row staggered with respect to the other rows.

12. A reflective roadway marker strip having, in combination, a first plurality of transversely extending parallel rows of uniformly spaced transversely oriented blocks protruding upwardly of the strip, and with successive of the parallel rows uniformly longitudinally spaced and transversely staggered with respect to one another; a second plurality of transversely extending parallel rows of transversely extending parallel rows of transversely uniformly spaced longitudinally oriented blocks similarly protruding upwardly of the strip, and with successive of the parallel rows thereof uniformly longitudinally spaced and transversely staggered with respect to one another; the first and second pluralities of rows being uniformly transversely and longitudinally interleaved, with the longitudinally oriented blocks symmetrically positioned in the transverse spaces between adjacent transversely oriented blocks of each row, and the transversely oriented blocks symmetrically positioned in the longitudinal spaces between adjacent transversely oriented blocks; and similar edge faces of the blocks of each of the pluralities of rows serving as reflective surfaces to light incident upon the strip at low angles of incidence to the roadway and from all directions about the strip.

13. A marker strip as claimed in claim 12 and in which all the blocks are of similarly dimensioned substantially rectangular configuration.

\* \* \* \* \*